United States Patent [19]

Ehashi et al.

[11] 4,310,359
[45] Jan. 12, 1982

[54] PIGMENT COMPOSITIONS

[75] Inventors: Shigeyuki Ehashi, Kawagoe; Junichi Tsuchida; Kenichi Kakimoto, both of Toyko; Hiromitsu Katsura, Tokorozawa, all of Japan

[73] Assignee: Toyo Ink Manufacturing Co., Ltd., Tokyo, Japan

[21] Appl. No.: 235,556

[22] Filed: Feb. 18, 1981

[30] Foreign Application Priority Data

Feb. 25, 1980 [JP] Japan ................... 55/21698

[51] Int. Cl.$^3$ ............................................. C09C 3/68
[52] U.S. Cl. .......................... 106/288 Q; 106/308 N; 106/308 S
[58] Field of Search ........... 106/288 B, 288 Q, 308 N, 106/308 S

[56] References Cited

U.S. PATENT DOCUMENTS

| | | | |
|---|---|---|---|
| 2,761,868 | 2/1956 | Lacey | 260/314.5 |
| 2,965,511 | 12/1960 | Moser | 106/288 Q |
| 3,370,971 | 2/1968 | Linton | 106/298 |
| 3,404,119 | 10/1968 | Harper et al. | 106/308 S |
| 3,418,322 | 12/1968 | Tulagin et al. | 260/279 |
| 4,055,556 | 11/1977 | Aeberli | 106/23 X |
| 4,088,507 | 5/1978 | Tanaka et al. | 106/288 Q |

FOREIGN PATENT DOCUMENTS

| | | | |
|---|---|---|---|
| 412466 | 2/1948 | Japan | 106/288 Q |
| 1058642 | 2/1967 | United Kingdom | 106/288 Q |
| 1181766 | 2/1970 | United Kingdom | 106/288 Q |
| 193623 | 5/1975 | United Kingdom | 106/288 Q |
| 1508576 | 4/1978 | United Kingdom | 106/288 Q |
| 1544839 | 4/1979 | United Kingdom | 106/288 Q |
| 2009205 | 6/1979 | United Kingdom | 106/288 Q |

Primary Examiner—James Poer
Attorney, Agent, or Firm—Kenway & Jenney

[57] ABSTRACT

A pigment composition is disclosed which includes a pigment and a coloring compound of the general formula (I),

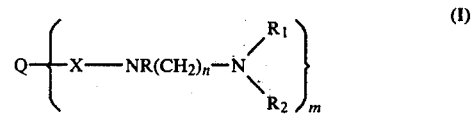

wherein Q represents a residue of a coloring compound other than phthalocyanine, X represents —SO$_2$— or —CO—, m and n represent, respectively, an integer of from 1 to 4 and an integer of from 1 to 6, R represents a hydrogen atom, an alkyl group having from 1 to 20 carbon atoms or an alkenyl group having from 2 to 20 carbon atoms, and R$_1$ and R$_2$ represent, independently, a hydrogen atom, a substituted or unsubstituted alkyl group having from 1 to 20 carbon atoms or a substituted or unsubstituted alkenyl group having from 2 to 20 carbon atoms, or R$_1$ and R$_2$ together form a heterocyclic ring which contains a nitrogen, oxygen or sulfur atom therein.

9 Claims, No Drawings

PIGMENT COMPOSITIONS

DESCRIPTION OF INVENTION

BACKGROUND OF THE INVENTION

1. Field of the Invention

The present invention relates to pigment compositions which have excellent properties for various applications, particularly non-flocculating and non-crystallising properties.

2. The Prior Art

In general, useful pigments which exhibit clear colour tone and high tinting strength in various coating compositions consist of fine particles. However, when fine particles of pigment are dispersed in non-aqueous vehicles for use as, for example, offset printing inks, gravure printing inks and paints, it is difficult to obtain stable dispersions, various problems arising with regard to the preparation, and value, of the resulting product. For instance, dispersions which contain pigments consisting of fine particles are often highly viscous and thus not only is it difficult to dispense the dispersion product and transport the same, but also, in a very bad case, the dispersion product cannot be used due to gellation during storage. Furthermore, when pigments of different types are mixed, undesirable phenomena such as colour separation by flocculation and precipitation can take place and may cause the dispersion system to be uneven in colour and may also considerably lower the tinting strength in non-aqueous vehicles. There may also arise problems such as lowering of gloss and inferiority of levelling in films made from such dispersion systems.

In addition to the problem of dispersion of the pigments, some organic pigments undergo a crystallization change. Crystals of a pigment which are unstable (from an energy viewpoint) change their sizes and form into those of a more stable state in a non-aqueous vehicle such as is used for offset printing inks, gravure printing inks and paints. This may naturally reduce the commercial value of the dispersion system, due to a remarkable change in colour tone, reduction of tinting strength and formation of coarse particles.

There have been a number of proposals to improve non-flocculation and crystal stability of pigments, particularly copper phthalocyanine pigments and quinacridone pigments.

Such proposals may be broadly classified from a technical point of view into the following two categories. The first category includes proposals for coating the surfaces of pigment particles with colourless compounds, such as silicon oxide, aluminium oxide and tert-butyl benzoate as disclosed in U.S. Pat. Nos. 3,370,971 and 2,965,511. The second category includes, as typically described in Japanese Pat. No. 41-2466 and U.S. Pat. No. 2,761,868, processes of admixing the pigments with compounds which are obtained by introducing into organic pigments, as a matrix skeleton, substituents (on side chains) such as a sulfo group, a sulfonamide group, an aminomethyl group, a phthalimidemethyl group and the like.

The processes of the second category are better than those of the first category, in that the second category of processes can provide better non-flocculation and crystal stability in a non-aqueous vehicle and ensure easy preparation of pigment compositions. However, the non-flocculation and crystal stability thereby obtained are not adequate.

Further, with respect to processes for mixing azo compounds, Japanese Pat. Nos. 45-11026 and 53-35090 disclose methods in which alkaline earth metal sulfonates and organic amine salt of azo dyes are admixed. However, the effects obtained by such methods are also inadequate.

Little work has been carried out with respect to pigments such as dioxazine, anthrapyrimidine, anthanthrone, indanthrone, flavanthrone, perynone, perylene, thioindigo and 4,4′-diamino-1,1′-dianthraquinonyl.

DESCRIPTION OF THE INVENTION

The present inventors have conducted extensive research with a view to overcoming, or at least mitigating, various problems which occur with pigment dispersions in non-aqueous vehicles used in, for example, offset printing inks, gravure printing inks or paints, as mentioned above, and have invented superior pigment compositions and processes of preparing the same.

According to the present invention there is provided a pigment composition which comprises a pigment and a colouring compound represented by the general formula (I),

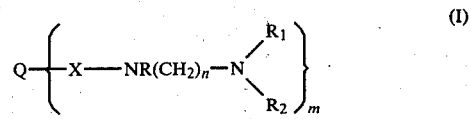

(I)

wherein Q represents a residue of a colouring compound other than phthalocyanine, X represents $-SO_2-$ or $-CO-$, m and n represent, respectively, an integer of from 1 to 4, and an integer of from 1 to 6, R represents a hydrogen atom, an alkyl group having from 1 to 20 carbon atoms or an alkenyl group having from 2 to 20 carbon atoms, and $R_1$ and $R_2$ represent, independently, a hydrogen atom, or a substituted or unsubstituted alkyl group having from 1 to 20 carbon atoms or a substituted or unsubstituted alkenyl group having from 2 to 20 carbon atoms, or $R_1$ and $R_2$ together form a heterocyclic ring with a nitrogen, oxygen or sulfur atom. Preferably, $R_1$ and $R_2$ together with the adjacent nitrogen atom form a heterocyclic ring which may optionally contain an oxygen or sulphur atom.

The pigment composition of the present invention are superior in non-flocculation and crystal stability as compared to the compositions obtained by the conventional processes. The pigment compositions of the present invention are also characterized by ease of preparation.

Compounds represented by the formula (I) can be obtained by reacting, for example, quinacridone, dioxazine, anthrapyrimidine, anthanthrone, indanthrone, flavanthrone, perynone, perylene, thioindigo, 4,4′-diamino-1,1′-dianthraquinonyl or azo compounds with chlorosulfonic acid or thionyl chloride to obtain the respective sulfonyl chloride or carbonyl chloride, which is then reacted with amine. As will be described hereinafter in the preparatory Examples, from 1 to 4 substituents may be introduced by this process.

Amines which may be used in the above process are exemplified by amines having the general formula (II),

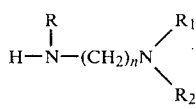

(II)

wherein n, R, $R_1$ and $R_2$ are as defined above. Among typical amines usable in the process are, for example, piperidinomethylamine, dimethylaminoethylamine, diethylaminoethylamine, dimethylaminopropylamine, diethylaminopropylamine, dibutylaminopropylamine, piperidinoethylamine, pipecolinoethylamine, morpholinoethylamine, piperidinopropylamine, pipecolinopropylamine, diethylaminohexylamine, diethylaminobutylamine, dimethylaminoamylamine, N,N-diethylamino ethyl-N'-laurylamine, 2-ethylhexylaminoethylamine, stearylaminoethylamine and oleylaminoethylamine.

When introduced into the side chain, as represented in the general formula (I), the above amines exhibit strong affinity to anionic residues such as carboxyl groups in resins contained in vehicles, and thus are believed to contribute to the improvement of the dispersion of pigments in various applications.

Furthermore, when the colouring compounds represented by the general formula (I) are substituted azo compounds, such compounds may be produced by the following two processes.

The first process comprises diazotizing, in a conventional manner, an aromatic amine having the following general formula,

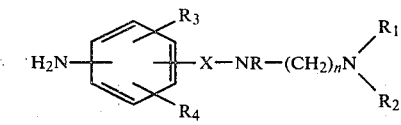

(III)

wherein n, X, R, $R_1$ and $R_2$ are as defined above and $R_3$ and $R_4$ represent, independently, a hydrogen atom, an alkyl group, a methoxy group, a halogen atom, a sulfo group or a nitro group and then coupling the diazotized amine with a commercial coupler such as a phenol, naphthol, acetoacetanilide, pyrazolone or oxyquinoline.

The second process comprises coupling a commercial diazotized base with a coupling component having any one of the following general formulae (IV), (V), (VI), (VII) and (VIII):

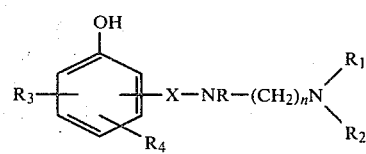

(IV)

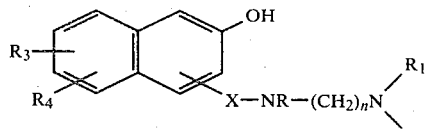

(V)

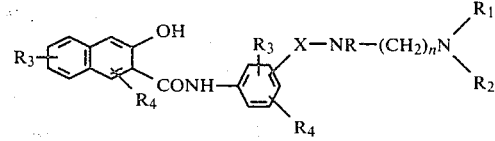

(VI)

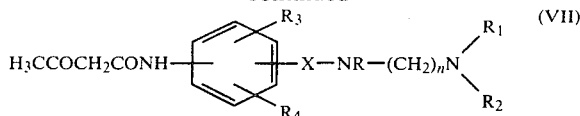

(VII)

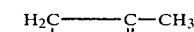

(VIII)

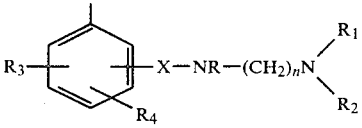

wherein n, X, R, $R_1$, $R_2$, $R_3$ and $R_4$ are as defined above.

It is possible to introduce two or more substituents according to the first or second process. For instance, an aromatic amine of the formula (III) may be coupled with the following coupling components:

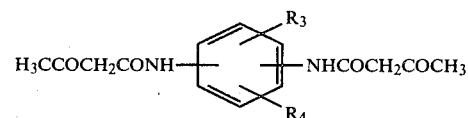

(IX)

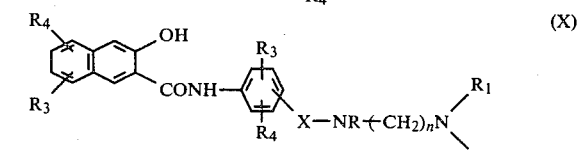

(X)

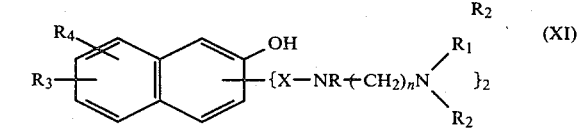

(XI)

wherein n, X, R, $R_1$, $R_2$, $R_3$ and $R_4$ are as defined above.

Referring to the general formula (I), $R_1$ and $R_2$ represent, independently, a hydrogen atom, or a substituted or unsubstituted alkyl group having from 1 to 20 carbon atoms or a substituted or unsubstituted alkenyl group having from 2 to 20 carbon atoms, or $R_1$ and $R_2$ together form a heterocyclic ring with a nitrogen, oxygen or sulfur atom. Especially when $R_1$ and $R_2$ represent an alkyl group having from 1 to 4 carbon atoms, extremely good pigment dispersions are obtained. The foregoing process offers the additional advantage that the amino compound used as the starting material can easily be produced.

As examples of pigments useful in the present invention, there may be mentioned organic pigments, for example, azo pigments such as soluble or insoluble azo pigments or condensed azo pigments, phthalocyanine pigments, quinacridone pigments, isoindolinone pigments, perylene-perynone pigments, dioxazine pigments, vat dye pigments and basic dye pigments, and inorganic pigments such as carbon black, titanium oxide, chrome yellow, cadmium yellow, cadmium red, red iron oxide, iron black, zinc flower, Prussian blue and ultramarine.

The compounds of the general formula (I) used in the present invention are preferably used in an amount in the range of from 0.3 to 30 parts by weight per 100 parts by weight of the pigment. An amount less than 0.3 part by weight may be disadvantageous because the effect of the compounds of the general formula (I) may not be satisfactorily attained, whereas an amount larger than 30 parts by weight may likewise not be advantageous because no increased beneficial effect can be expected.

Although the pigment composition according to the present invention may be prepared by merely mixing a powder of a pigment with a powder of the compound represented by the general formula (I), good results can be obtained by mechanically mixing them in kneaders, rollers, attritors, super mills or various types of powdering or milling machines, by adding a solution containing the compound of the general formula (I) to a suspension system of a pigment in water or an organic solvent, thereby permitting the compound of the general formula (I) to deposit on the surface of the pigment, or by co-dissolving both an organic pigment and the compound of the general formula (I) in a solvent providing good dissolution, such as sulfuric acid, and then co-precipitating them with use of a poor solvent, such as water.

When the thus-obtained pigment compositions are used in various offset printing ink vehicles, such as rosin-modified resins and in gravure printing inks, such as lime rosin varnishes, polyamide resin varnishes and polyvinyl chloride resin varnishes, or used in nitrocellulose lacquers, room temperature drying or baking paints of aminoalkyd resins, acryl lacquers, baking paints of aminoacryl resins or urethane resin paints. The compositions serve to lower the viscosity of the dispersant and reduce the structural viscosity of the dispersion system and thus good fluidity is obtained as compared with the use of a pigment alone. In addition, the pigment composition according to the invention does not normally present problems such as colour separation and changes in crystals but rather can impart good colour tone and gloss to printed matter, mouldings or films.

The following Preparatory Examples, describe general procedures of preparing typical compounds represented by the general formula (I). Herein, all parts and percentages are by weight unless the context requires otherwise.

PREPARATORY EXAMPLE 1

Ten parts of unsubstituted quinacridone was added to 100 parts of chlorosulfonic acid at from 10° to 20° C., stirred for 3 hours at from 40° to 50° C., then poured into 1,000 parts of ice water, filtered and washed with water, whereupon a water cake of quinacridone monochlorosulfonate was obtained quantitatively. The water cake of this chlorosulfonate was added to 300 parts of ice water to obtain a slurry, and then 20 parts of N,N-diethylaminopropylamine were added thereto. The mixture was stirred at a temperature of not more than 10° C. for 4 hours, then filtered and washed with water. Then, the water cake was added to 300 parts of a 0.5% aqueous solution of sodium carbonate, stirred for one hour, filtered, washed with water until it was neutralized and dried to obtain 16 parts of a quinacridone derivative having the following structure.

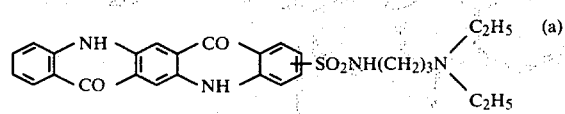

The values obtained by the elemental analysis of the compound (a) were substantially equal to the calculated values.

Various amines were reacted with the quinacridone monochlorosulfonate obtained in a manner similar to the above, to provide the quinacridone derivatives having the following formulas, quantitatively.

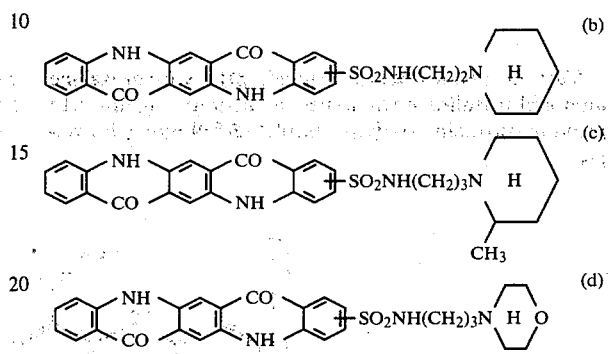

PREPARATORY EXAMPLE 2

In a manner similar to Preparatory Example 1, 2,9-dimethylquinacridone was chlorosulfonated to obtain a dichlorosulfonate, which was then reacted with N,N-diethylaminoethylamine to obtain a quinacridone derivative of the following formula, quantitatively.

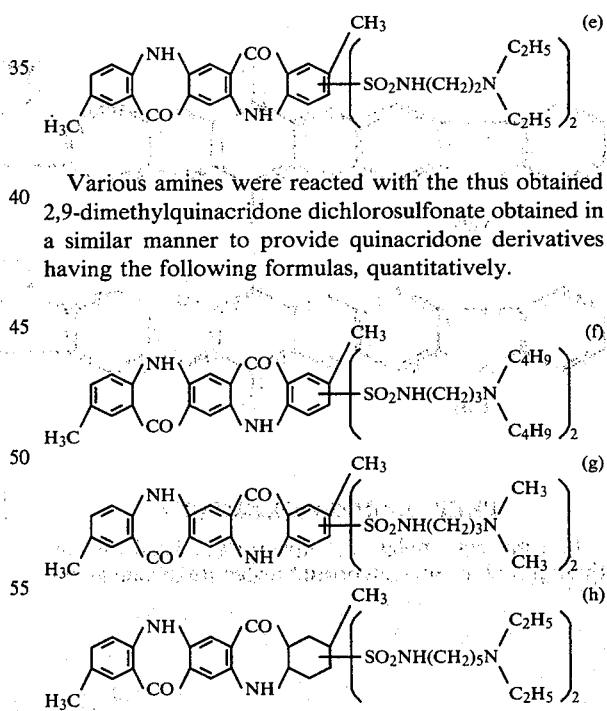

Various amines were reacted with the thus obtained 2,9-dimethylquinacridone dichlorosulfonate obtained in a similar manner to provide quinacridone derivatives having the following formulas, quantitatively.

PREPARATORY EXAMPLE 3

In a manner similar to Preparatory Example 1, dioxazine was chlorosulfonated to obtain a monochlorosulfonate, which was then reacted with N,N-dimethylaminopropylamine to obtain a dioxazine derivative of the following formula, quantitatively.

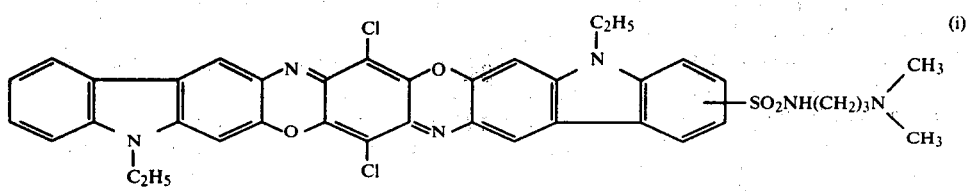

Various amines were reacted with the dioxazine monochlorosulfonate obtained in a similar manner to provide dioxazine derivatives of the following formulas.

chlorosulfonate which was then reacted with N,N-diethylaminopropylamine to obtain an anthrapyrimidine derivative of the following formula, quantitatively.

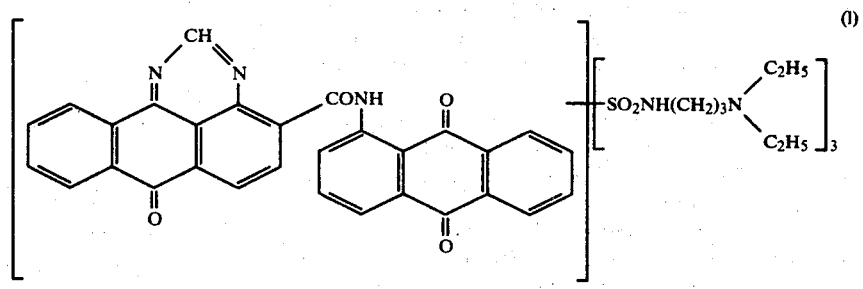

Various amines were reacted with the anthrapyrimidine trichlorosulfonate, obtained in a similar manner, to provide anthrapyrimidine derivatives of the following formulas, quantitatively.

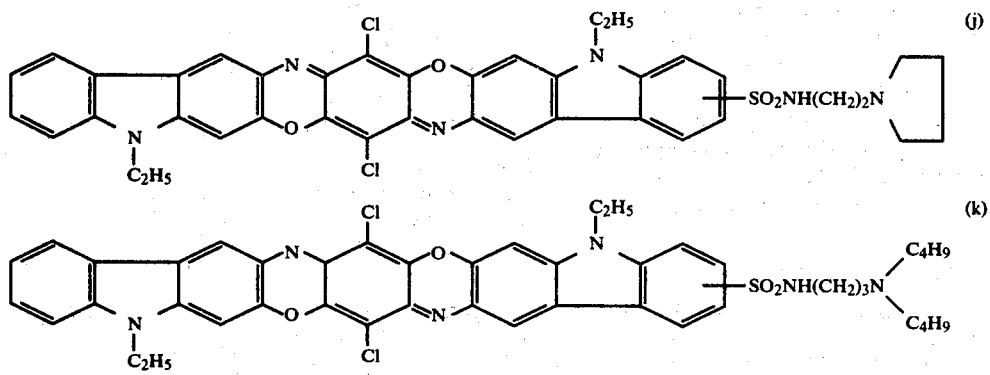

PREPARATORY EXAMPLE 4

In a manner similar to Preparatory Example 1, anthrapyrimidine was chlorosulfonated to obtain a tri-

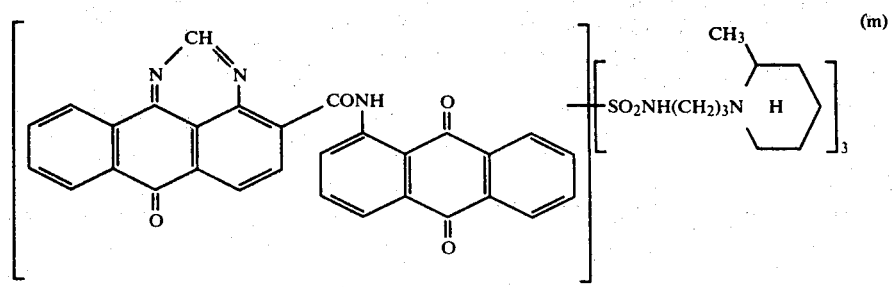

-continued

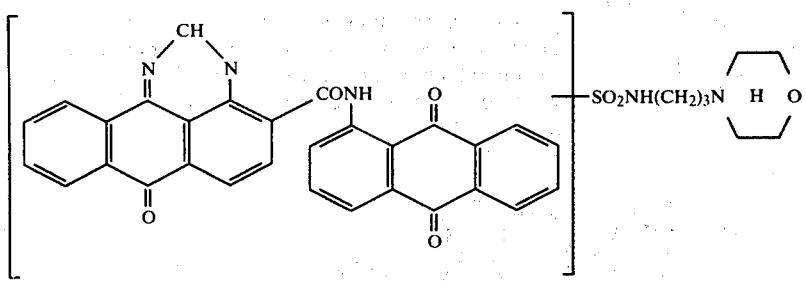

(n)

PREPARATORY EXAMPLE 5

In a manner similar to Preparatory Example 1, indanthrone was chlorosulfonated to obtain a monochlorosulfonate, which was then reacted with N,N-dimethylaminoethylamine to obtain an indanthrone derivative of the following formula, quantitatively.

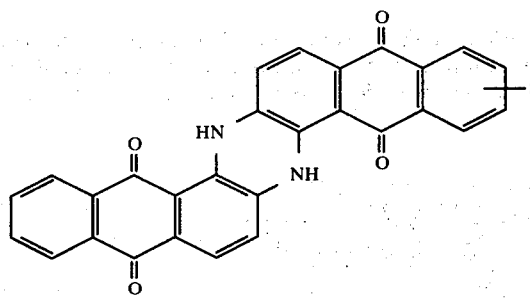

(o)

Various amines were reacted with indanthrone monochlorosulfonate obtained in a similar method, to provide indanthrone derivatives of the following formulas, quantitatively.

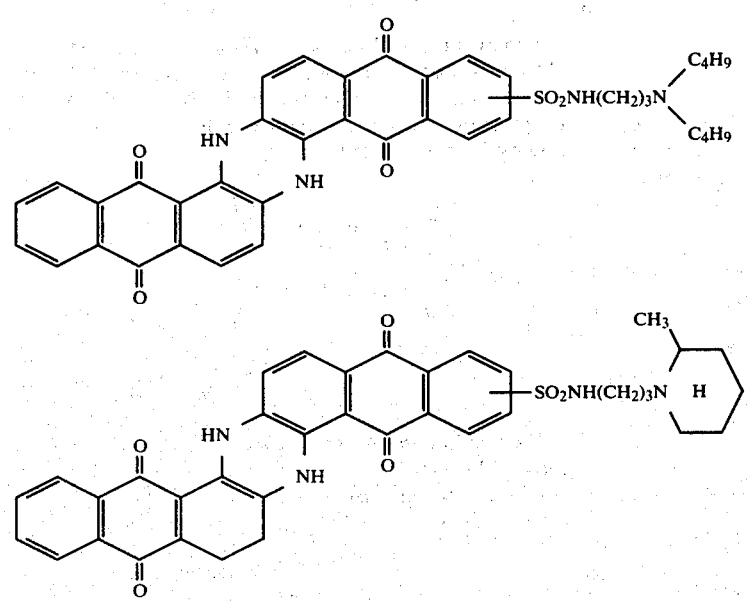

(p)

(q)

PREPARATORY EXAMPLE 6

In a manner similar to Preparatory Example 1, dibromoanthanthrone was chlorosulfonated to obtain a dichlorosulfonate, which was then reacted with N,N-diethylaminopropylamine, to obtain a dibromoanthanthrone derivative of the following formula.

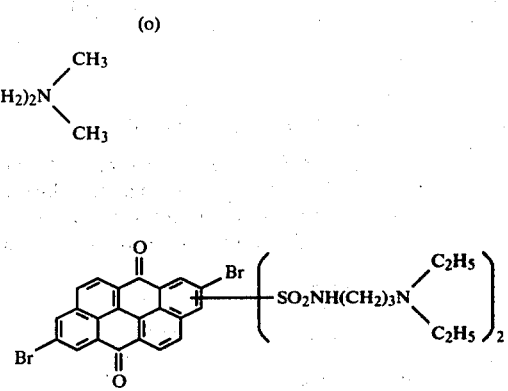

(r)

Various amines were reacted with the dibromoanthanthrone dichlorosulfonate, obtained in a similar manner, to provide dibromoanthanthrone derivatives of the following formulas.

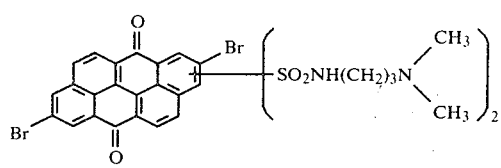
(s)

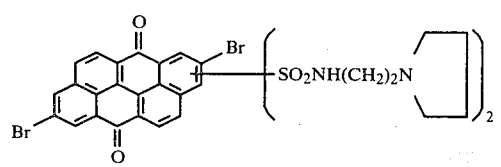
(t)

PREPARATORY EXAMPLE 7

In a manner similar to Preparatory Example 1, flavanthrone was chlorosulfonated to obtain a tetrachlorosulfonate, which was then reacted with N-aminopropyl-2-pipecoline, to obtain a flavanthrone derivative of the following formula,

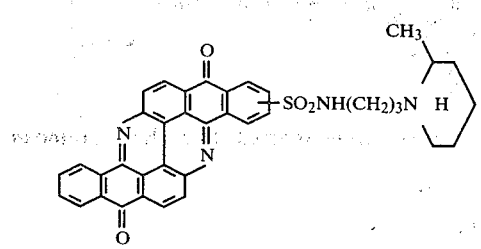
(u)

Various amines were reacted with the flavanthrone chlorosulfonate, obtained in a similar manner, to provide flavanthrone derivatives of the following formulas.

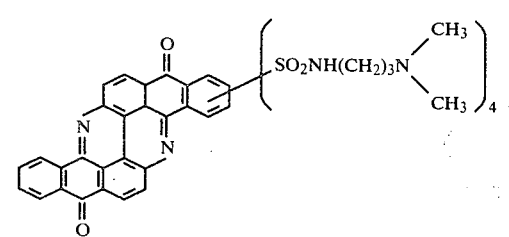
(v)

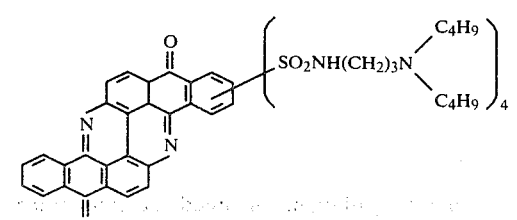
(w)

PREPARATORY EXAMPLE 8

In a manner similar to Preparatory Example 1, perynone was chlorosulfonated to obtain a monochlorosulfonate, which was then reacted with N-aminoethylpyrrolidine to obtain a perynone derivative of the following formula.

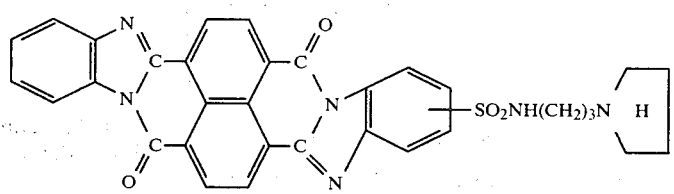
(x)

Various amines were reacted with the perynone monochlorosulfonate obtained, in a similar method, to provide perynone derivatives of the following formulas.

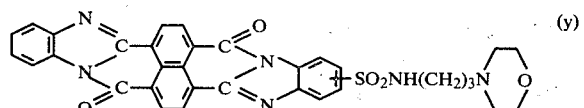
(y)

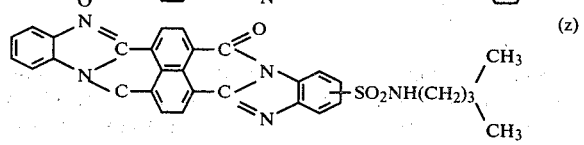
(z)

PREPARATORY EXAMPLE 9

In a manner to Preparatory Example 1, perylene was chlorosulfonated to obtain a monochlorosulfonate, which was then reacted with N,N-diethylaminopropylamine to obtain a perylene derivative of the following formula, quantitatively.

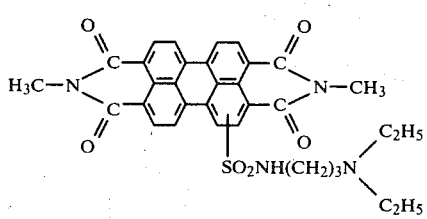
(a')

Various amines were reacted with the perylene monochlorosulfonate, obtained in a similar method, to provide perylene derivatives of the following formulas, quantitatively.

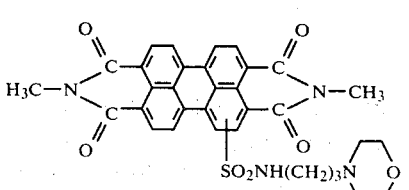
(b')

-continued (c')

[Structure: perylene tetracarboxylic diimide with N-CH3 groups and SO2NH(CH2)2N(C2H5)2 substituent]

PREPARATORY EXAMPLE 10

In a manner similar to Preparatory Example 1, thioindigo was chlorosulfonated to obtain a mixture comprising 60% of a monolchlorosulfonate and 40% of a dichlorosulfonate, which was then reacted with N,N-dibuthylpropylamine to obtain a thioindigo derivative of the following formula.

(d')

[Thioindigo structure with Cl substituents and —SO2NH(CH2)3N(C4H9)2 groups, 1 or 2]

Various amines were reacted with the thioindigo chlorosulfonates, obtained in a similar manner, to provide thioindigo derivatives of the following formulas.

(e')

[Thioindigo structure with Cl substituents and —SO2NH(CH2)3N(CH3)2 groups, 1 or 2]

(f')

[Thioindigo structure with Cl substituents and —SO2NH(CH2)3N-morpholine groups, 1 or 2]

PREPARATORY EXAMPLE 11

In a manner similar to Preparatory Example 1, 4,4'-diamino-1,1'-dianthraquinonyl was chlorosulfonated to obtain a dichlorosulfonate, which was then reacted with N,N-diaminopropylamine to obtain a 4,4'-diamino-1,1'-anthraquinonyl derivative of the following formula.

(g')

[4,4'-diamino-1,1'-dianthraquinonyl structure with —SO2NH(CH2)3N(C2H5)2 substituents]

Various amines were reacted with 4,4'-diamino-1,1'-anthraquinonyl dichlorosulfonate obtained in a similar manner, to provide dianthraquinonyl derivatives of the following formulas, quantitatively.

(h')

[dianthraquinonyl structure with —SO2NH(CH2)3N(C4H9)2 substituents]

(i')

[dianthraquinonyl structure with —SO2NH(CH2)2N-pyrrolidine substituents]

PREPARATORY EXAMPLE 12

Ten parts of quinacridone-2,9-dicarboxylic acid obtained by the hydrolysis of 2,9-dicarboxylic acid methyl ester of quinacridone in concentrated sulfuric acid, were added to 50 parts of chlorosulfonic acid, stirred at from 10° to 20° C. for 3 hours, poured into 1,000 parts of ice water, filtered and washed with water, whereupon a water cake of quinacridone-2,9-dicarboxylic acid chloride was obtained quantitatively. This water cake was added to mixed solvent comprising 200 parts of water and 100 parts of dioxane, to obtain a slurry, and then, 20 parts of N,N-diethylaminoethylamine and 5 parts of sodium carbonate were added to the slurry. The slurry was stirred at from 10° to 20° C. for 3 hours and then at from 70° to 80° C. for one hour, filtered, and washed with water to obtain 18 parts of a quinacridone derivative of the following formula.

(j')

[Quinacridone derivative structure with —CONH(CH2)2N(C2H5)2 groups on both ends]

The values obtained by the elemental analysis of this compound (j') were substantially equal to the calculated values.

Various amines were reacted with the quinacridone-2,9-dicarboxylic acid chloride obtained in a similar manner, to provide quinacridone derivatives of the following formulas.

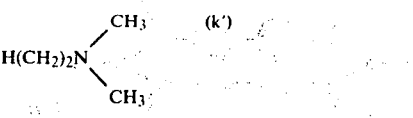
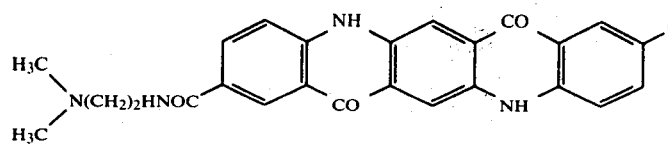

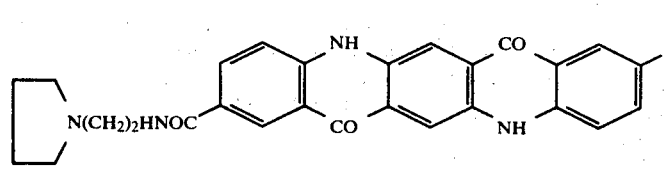

PREPARATORY EXAMPLE 13

Twenty parts of anthrapyrimidine carboxylic acid were added to 100 parts of chlorosulfonic acid, and stirred at from 20° to 30° C. for 3 hours, and then 5 parts of thionyl chloride were added and the mixture was stirred at from 40° to 50° C. for 2 hours. Then the resulting reaction mixture was poured into 100 parts of ice water, filtered and washed with water to obtain a water cake of the carbonyl chloride quantitatively. This water cake was added to 300 parts of acetone to obtain a slurry, and 10 parts of N-aminopropyl-2-pipecoline were then added. The mixture was stirred at from 30° to 40° C. for 4 hours and 5 parts of sodium carbonate were added. The mixture was stirred at from 70° to 80° C. for one hour, filtered, washed with water and dried to obtain 25 parts of an anthrapyrimidine derivative of the following formula.

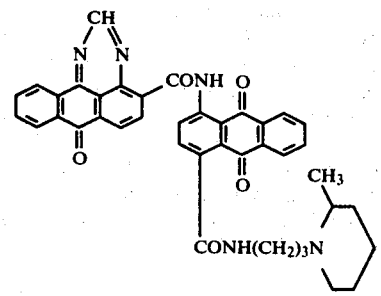

The values of the elemental analysis of the compound (m') were substantially equal to the calculated values.

Various amines were reacted with the anthrapyrimidine carboxylic acid chloride obtained in a similar manner, to obtain anthrapyrimidine derivatives of the following formulas.

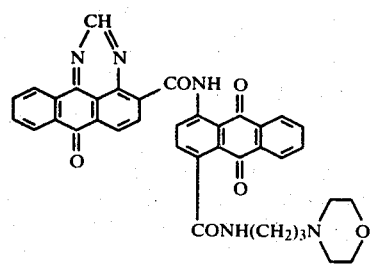

-continued (o')

[structure with C4H9 groups]

PREPARATORY EXAMPLE 14

β-hydroxynaphthoic acid was refluxed in benzene with an equimolar amount of thionyl chloride with heating and stirring for one hour, to synthesize β-hydroxynaphthoic acid chloride. After the reaction, N,N-diethylaminopropylamine was added and the refluxing was continued with heating and stirring for an additional one hour, whereupon the following coupling component was obtained.

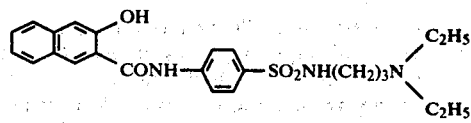

Coupling was carried out with this coupling component to obtain the following azo dye.

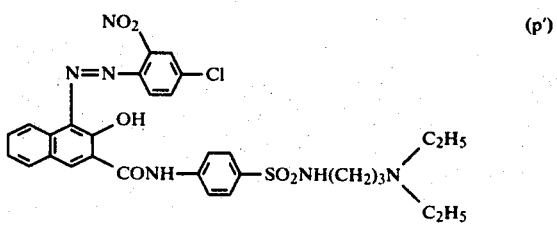

PREPARATORY EXAMPLE 15 p-Nitrobenzoyl chloride was refluxed in benzene with N,N-diethylaminoethyloleylamine for one hour to synthesize a carboxylic acid amide. Then, reduction of the nitro group was carried out in a conventional manner to obtain the following diazo component.

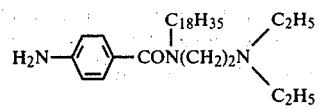

This base was diazotized and subjected to coupling according in a conventional manner to obtain the following diazo dye.

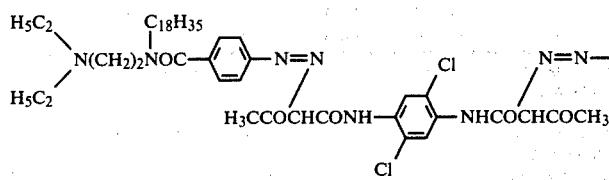

PREPARATORY EXAMPLE 16

A sulfonic amide, which was obtained by refluxing for 2 hours p-acetylaminosulfonyl chloride and N,N-diethylaminoethylamine or N,N-diethylaminopropylamine in benzene or acetone and with stirring and heating, was refluxed in a dilute hydrochloric acid solution for one hour to hydrolyze the same into the following diazo components:

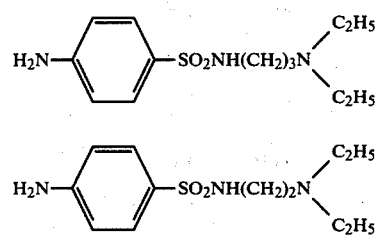

These bases were diazotized and subjected to coupling in a conventional manner to obtain the following diazo dyes (r') and (s'), respectively.

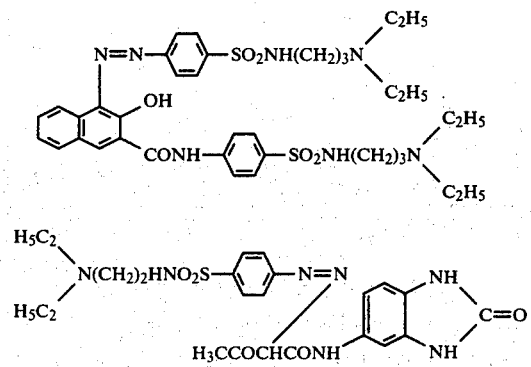

PREPARATORY EXAMPLE 17

The base (i) obtained by Preparatory Example 16 and an equimolar amount of diketene were refluxed in xylene with heating and stirring for one hour to obtain the following coupling component.

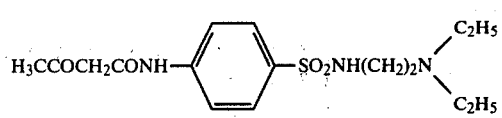

Coupling was carried out between this coupling component and a diazotized base to obtain the following azo dye.

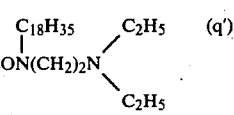

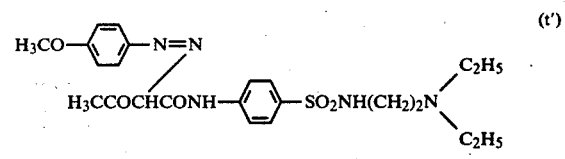

PREPARATORY EXAMPLE 18

Ten parts of an azo dye of the following formula (u') was stirred with 50 parts of chlorosulfonic acid at about 50° C. for one hour, poured into ice water, filtered, and washed with water. A water cake of the chlorosulfonate thereby obtained, was again added to 200 parts of ice water to obtain a slurry. Dimethylaminopropylamine was added dropwise to the slurry and stirred at from 10° to 20° C. for 5 hours, whereupon an azo dye having the following formula (v') was obtained.

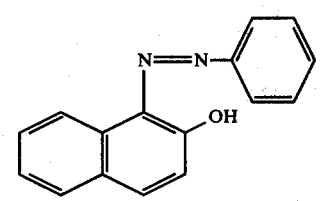

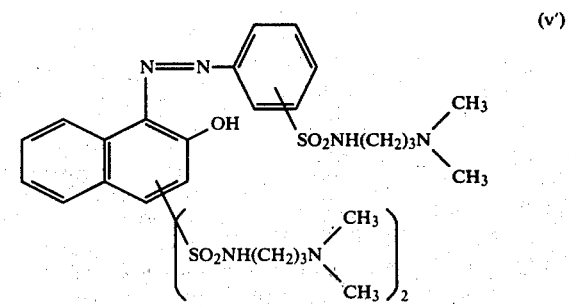

It was found by an analysis of reductive decomposition of azo groups that two chlorosulfo groups had been introduced into the naphthalene ring and one chlorosulfonyl group had been introduced into the benzene ring.

The present invention will be further illustrated by the following Examples and Comparative Examples. The chemical formulae of compounds identified with letters correspond to those shown in the Preparatory Examples.

COMPARATIVE EXAMPLES AND EXAMPLES 1 TO 18

Gravure Printing Inks

To a vinyl chloride resin varnish for a gravure printing ink were added various types of pigments used alone (Comparative Examples) or mixtures of pigments and the compounds obtained in Preparatory Examples 1 to 18 (Examples 1 to 18). The pigment content was 10% or 25% (when inorganic pigments were used). The viscosities of these inks were measured. The results are shown in Table 1, from which it is seen that the pigment compositions of the present invention have excellent fluidity.

Furthermore, it was found that the gravure printing inks prepared using the pigment compositions of the present invention were excellent with regard to clearness of colour tone, tinting strength and gloss of printed matter.

TABLE 1

| | | | | Viscosity of Gravure Printing Inks (B.M. Model Rotary Viscometer) | | | | |
|---|---|---|---|---|---|---|---|---|
| | | Compound identification | Mixing ratio | Viscosity/cps Number of revolutions of rotor | | | | |
| | Pigment | | | 6 | 12 | 30 | 60 |
| Comparative Example | C.I. Pigment Yellow 83 | — | — | 3530 | 1520 | 840 | 610 |
| 1 | C.I. Pigment Yellow 83 | l | 90:10 | 1520 | 1010 | 680 | 610 |
| 2 | C.I. Pigment Yellow 83 | n | " | 1450 | 1020 | 720 | 450 |
| 3 | C.I. Pigment Yellow 83 | v | 95:5 | 1580 | 1090 | 730 | 620 |
| 4 | C.I. Pigment Yellow 83 | w | 90:10 | 1350 | 990 | 710 | 440 |
| 5 | C.I. Pigment Yellow 83 | y | " | 1440 | 1070 | 780 | 640 |
| Comparative Example | C.I. Pigment Red 17 | — | — | 5380 | 2790 | 1800 | 980 |
| 6 | C.I. Pigment Red 17 | a | 90:10 | 2730 | 1350 | 770 | 600 |
| 7 | C.I. Pigment Red 17 | k | " | 2430 | 1220 | 690 | 540 |
| 8 | C.I. Pigment Red 17 | x | " | 2200 | 1100 | 650 | 530 |
| 9 | C.I. Pigment Red 17 | j' | 95:5 | 2410 | 1210 | 670 | 530 |
| 10 | C.I. Pigment Red 17 | r' | 85:15 | 2200 | 1100 | 650 | 540 |
| Comparative Example | C.I. Pigment Red 48 | — | — | 6200 | 3100 | 1720 | 1240 |
| 11 | C.I. Pigment Red 48 | b | 90:10 | 3100 | 1350 | 880 | 830 |
| 12 | C.I. Pigment Red 48 | h | 85:15 | 2790 | 1350 | 930 | 900 |
| 13 | C.I. Pigment Red 48 | t | 95:5 | 2580 | 1090 | 910 | 880 |
| 14 | C.I. Pigment Red 48 | p' | 90:10 | 3100 | 1350 | 880 | 800 |
| Comparative Example | C.I. Pigment Yellow 34* | — | — | 870 | 620 | 560 | 520 |
| 15 | C.I. Pigment Yellow 34* | m | 90:10 | 620 | 460 | 370 | 350 |
| 16 | C.I. Pigment Yellow 34* | s' | " | 630 | 470 | 350 | 330 |
| Comparative Example | C.I. Pigment White 6* | — | — | 790 | 600 | 550 | 490 |
| 17 | C.I. Pigment White 6* | c | 95:5 | 570 | 430 | 390 | 360 |
| 18 | C.I. Pigment White 6* | g' | 90:10 | 590 | 460 | 400 | 380 |

*Inorganic pigment. The content of the pigment in gravure printing ink is 25%.

EXAMPLES 19 TO 43

Aminoalkyd Resin Baking Paints

To an aminoalkyd resin varnish for a baking paint were added various pigments, alone (Comparative Examples) and as admixtures with the compounds obtained in Preparatory Examples 1 to 17. The pigment content of the pigmented varnishes was 6% or 25% (when inorganic pigments were used. The viscosities of the paints were measured and the results are shown in Table 2.

The aminoalkyd paints of these Examples were found to have excellent fluidity and crystal stability. Moreover, films obtained from such paints were excellent in clearness of colour, tinting strength and gloss. Moreover, these paints showed no tendency to increase in viscosity and were thus judged excellent in storage stability.

TABLE 2

Viscosity of Aminoalkyd Resin Baking Paints (B.M. Model Rotary Viscometer)

| | Pigment | Compound identification | Mixing ratio | Viscosity/cps Number of revolutions of rotor | | | |
|---|---|---|---|---|---|---|---|
| | | | | 6 | 12 | 30 | 60 |
| Comparative Example | C.I. Pigment Blue 15 | — | — | 8700 | 6100 | 3550 | 2600 |
| 19 | C.I. Pigment Blue 15 | i | 90:10 | 2100 | 1300 | 980 | 950 |
| 20 | C.I. Pigment Blue 15 | o | " | 2310 | 1250 | 970 | 850 |
| 21 | C.I. Pigment Blue 15 | q | 95:5 | 1930 | 1020 | 870 | 840 |
| 22 | C.I. Pigment Blue 15 | q' | 90:10 | 2200 | 1310 | 1000 | 920 |
| Comparative Example | C.I. Pigment Violet 19 | — | — | 8100 | 4600 | 2210 | 1230 |
| 23 | C.I. Pigment Violet 19 | a | 90:10 | 4800 | 2900 | 1480 | 970 |
| 24 | C.I. Pigment Violet 19 | c | " | 3780 | 1910 | 1020 | 900 |
| 25 | C.I. Pigment Violet 19 | q | 85:15 | 3730 | 1920 | 1070 | 950 |
| 26 | C.I. Pigment Violet 19 | b' | 95:5 | 3550 | 1920 | 1200 | 910 |
| 27 | C.I. Pigment Violet 19 | k' | " | 3400 | 1830 | 1010 | 900 |
| Comparative Example | C.I. Pigment Yellow 93 | — | — | 1600 | 1440 | 1320 | 1100 |
| 28 | C.I. Pigment Yellow 93 | q' | 90:10 | 920 | 780 | 620 | 550 |
| Comparative Example | C.I. Pigment Yellow 108 | — | — | 8900 | 6300 | 3800 | 2700 |
| 29 | C.I. Pigment Yellow 108 | u | 85:15 | 2320 | 1270 | 980 | 870 |
| 30 | C.I. Pigment Yellow 108 | s' | 90:10 | 1930 | 1020 | 860 | 820 |
| 31 | C.I. Pigment Yellow 108 | o' | " | 2100 | 1300 | 960 | 920 |
| Comparative Example | C.I. Pigment Red 168 | — | — | 2200 | 1800 | 1610 | 1510 |
| 32 | C.I. Pigment Red 168 | s | 90:10 | 1100 | 810 | 720 | 620 |
| 33 | C.I. Pigment Red 168 | e' | 95:5 | 1010 | 780 | 690 | 590 |
| 34 | C.I. Pigment Red 168 | h' | " | 1050 | 780 | 680 | 550 |
| Comparative Example | C.I. Pigment Red 177 | — | — | 3540 | 1620 | 980 | 720 |
| 35 | C.I. Pigment Red 177 | b | 95:5 | 1450 | 1020 | 710 | 520 |
| 36 | C.I. Pigment Red 177 | g' | " | 1350 | 990 | 710 | 430 |
| 37 | C.I. Pigment Red 177 | i' | 90:10 | 1440 | 1010 | 780 | 640 |
| Comparative Example | C.I. Pigment Red 179 | — | — | 8100 | 4500 | 2100 | 1250 |
| 38 | C.I. Pigment Red 179 | b | 90:10 | 3780 | 1900 | 1020 | 890 |
| 39 | C.I. Pigment Red 179 | y | " | 3480 | 1920 | 1150 | 910 |
| Comparative Example | C.I. Pigment Orange 36 | — | — | 700 | 600 | 520 | 480 |
| 40 | C.I. Pigment Orange 36 | l | 85:15 | 440 | 380 | 340 | 300 |
| 41 | C.I. Pigment Orange 36 | w | 90:10 | 390 | 300 | 260 | 220 |

TABLE 2-continued

Viscosity of Aminoalkyd Resin Baking Paints
(B.M. Model Rotary Viscometer)

| | | Compound identifi- cation | Mixing ratio | Viscosity/cps Number of revolutions of rotor | | | |
|---|---|---|---|---|---|---|---|
| | Pigment | | | 6 | 12 | 30 | 60 |
| 42 | C.I. Pigment Orange 36 | z | 95:5 | 420 | 400 | 370 | 340 |
| Comparative Example | C.I. Pigment Brown 25 | — | — | 1440 | 1230 | 1100 | 1010 |
| 43 | C.I. Pigment Brown 25 | q' | " | 820 | 710 | 630 | 540 |

As for the dispersion stability, comparison was made with use of working examples relating to the colour separation stability which is especially important for practical applications.

The paints shown in the Examples of Table 2, were mixed with a base paint of titanium oxide which had preliminarily been prepared with an aminoalkyd resin varnish, so that the ratio of the listed pigments to the titanium oxide was 1/10, whereupon light coloured paints were obtained.

The light coloured paints were further diluted with xylene and the viscosity was adjusted at 20 seconds (25° C.) by the Ford Cup No. 4. The diluted paints were introduced into test tubes, and the changes at the glass walls were observed. The results of the observations are shown in Table 3.

EXAMPLES 44 TO 61

Nitrocellulose Lacquer Paints

A nitrocellulose lacquer was admixted with C.I. pigment Blue 15 alone (Comparative Example) and with mixed pigment compositions comprising C.I. pigment Blue 15 and several compounds obtained in Preparatory Examples 1 to 18 in a proportion of 95:5 so that the pigment components constituted in 5.5%. The viscosities of the paints thereby obtained are shown in Table 4. Likewise, combinations of other pigments and various compounds of the present invention were added to a nitrocellulose lacquer, were tested for their viscosities and the results obtained are shown in Table 4.

In each case, the composition of the present invention exhibited good fluidity, and the coloured film obtained

TABLE 3

| Example | Pigment | Compound identifi- cation | Mixing ratio | Immediately after preparation | 1 day after preparation | 1 week after preparation |
|---|---|---|---|---|---|---|
| Comparative Example | C.I. Pigment Blue 15 | — | — | Δ | x | x |
| 19 | C.I. Pigment Blue 15 | i | 90:10 | | | |
| Comparative Example | C.I. Pigment Violet 19 | — | — | Δ | x | x |
| 24 | C.I. Pigment Violet 19 | c | 90:10 | | | |
| Comparative Example | C.I. Pigment Red 168 | — | — | | Δ | x |
| 33 | C.I. Pigment Red 168 | e' | 95:5 | | | |
| Comparative Example | C.I. Pigment Red 179 | — | — | Δ | x | x |
| 39 | C.I. Pigment Red 179 | y | 90:10 | | | |

Evaluation:
Completely uniform
White streaks appear in a slight degree
Δ White stripe patterns appear
x White substance is completely separated In each case, the composition of the present invention exhibited superior effects.

from such a composition had excellent gloss, clearness and tinting strength.

TABLE 4

Viscosity of Paints Using Nitrocellulose Lacquer
(B.M. Model Viscometer)

| | Pigment | Compound identification | Mixing ratio | Viscosity/cps Number of revolutions of rotor | | | |
|---|---|---|---|---|---|---|---|
| | | | | 6 | 12 | 30 | 60 |
| Comparative Example | C.I. Pigment Blue 15 | — | — | 7800 | 4500 | 3120 | 2880 |
| 44 | C.I. Pigment Blue 15 | g | 95:5 | 3920 | 2800 | 2050 | 1900 |
| 45 | C.I. Pigment Blue 15 | o | 90:10 | 3830 | 2720 | 2100 | 1840 |
| 46 | C.I. Pigment Blue 15 | e' | " | 4230 | 2770 | 2170 | 1920 |
| 47 | C.I. Pigment Blue 15 | q' | 95:5 | 3940 | 2810 | 2080 | 1920 |
| Comparative Example | C.I. Pigment Red 123 | — | — | 8900 | 6010 | 5430 | 4960 |
| 48 | C.I. Pigment Red 123 | s | 90:10 | 3610 | 2120 | 1420 | 1200 |
| 49 | C.I. Pigment Red 123 | a' | " | 3810 | 2300 | 1570 | 1180 |
| 50 | C.I. Pigment Red 123 | l' | 85:15 | 3070 | 1520 | 1070 | 880 |
| 51 | C.I. Pigment Red 123 | p' | 90:10 | 3620 | 2130 | 1440 | 1210 |
| Comparative Example | C.I. Pigment Yellow 12 | — | — | 12300 | 8200 | 5320 | 4230 |
| 52 | C.I. Pigment Yellow 12 | l | 95:5 | 5380 | 3900 | 3010 | 2840 |
| 53 | C.I. Pigment Yellow 12 | s' | 90:10 | 6320 | 4510 | 3120 | 2900 |
| 54 | C.I. Pigment Yellow 12 | g' | 85:15 | 5650 | 4020 | 3010 | 2800 |
| Comparative Example | C.I. Pigment Orange 36 | — | — | 2300 | 2010 | 1800 | 1650 |
| 55 | C.I. Pigment Orange 36 | d | 90:10 | 1010 | 880 | 660 | 520 |
| 56 | C.I. Pigment Orange 36 | y | " | 1200 | 900 | 830 | 670 |
| 57 | C.I. Pigment Orange 36 | h' | 95:5 | 980 | 870 | 720 | 580 |
| Comparative Example | C.I. Pigment Black 6 | — | — | 13400 | 11000 | 6280 | 4990 |
| 58 | C.I. Pigment Black 6 | a | 90:10 | 6500 | 5430 | 4700 | 4500 |
| 59 | C.I. Pigment Black 6 | e | " | 6820 | 5900 | 4980 | 4670 |
| 60 | C.I. Pigment Black 6 | f | 95:5 | 8730 | 6550 | 5310 | 4980 |
| 61 | C.I. Pigment Black 6 | q' | " | 6820 | 5900 | 4950 | 4690 |

The paints shown in the Examples of Table 4 were stored at 50° C. for 3 months and their viscosities were measured, and the results thereby obtained are shown in Table 5.

TABLE 5

Viscosity of Paints Using Nitrocellulose Lacquer Immediately after their Preparation and 3 Months after the Preparation

| | Pigment | Compound identification | Mixing ratio | | Viscosity/cps Number of revolutions of rotor | | | |
|---|---|---|---|---|---|---|---|---|
| | | | | | 6 | 12 | 30 | 60 |
| Comparative Example | C.I. Pigment Blue 15 | — | — | Immediately after preparation | 7800 | 4500 | 3120 | 2880 |
| | " | — | — | After 3 months | 12300 | 7560 | 5230 | 3210 |
| 44 | " | g | 95:5 | Immediately after Preparation | 3920 | 2800 | 2050 | 1900 |
| | " | " | " | After 3 months | 3950 | 2820 | 2150 | 1940 |

TABLE 5-continued

Viscosity of Paints Using Nitrocellulose Lacquer Immediately after their Preparation and 3 Months after the Preparation

| | Pigment | Compound identification | Mixing ratio | | Viscosity/cps Number of revolutions of rotor | | | |
|---|---|---|---|---|---|---|---|---|
| | | | | | 6 | 12 | 30 | 60 |
| Comparative Example | C.I. Pigment Red 123 | — | — | Immediately after Preparation | 8900 | 6010 | 5430 | 4960 |
| | " | — | — | After 3 months | 13000 | 9200 | 6300 | 5210 |
| 48 | " | s | 90:10 | Immediately after Preparation | 3610 | 2120 | 1420 | 1200 |
| | " | " | " | After 3 months | 3720 | 2240 | 1530 | 1290 |
| Comparative Example | C.I. Pigment Orange 36 | — | — | Immediately after Preparation | 2300 | 2010 | 1800 | 1650 |
| | " | — | — | After 3 months | 9300 | 7600 | 6200 | 5310 |
| 56 | " | y | 90:10 | Immediately after Preparation | 1200 | 900 | 830 | 670 |
| | " | " | " | After 3 months | 1210 | 920 | 850 | 670 |

It is seen from the results of Table 5 that the compositions according to the present invention exhibited excellent storage stability.

EXAMPLE 62

Aminoacryl Baking Paint

An aminoacryl baking paint varnish was admixed with C.I. pigment Orange 36 alone (Comparative Example) and with a mixed pigment composition comprising C.I. pigment Orange 36 and compound d in a proportion of 90:10, so that in both cases the pigment component constituted 6%. The fluidity of the paints thus obtained were compared and it was found that the paint using the pigment composition of the present invention was much superior to the Comparative Example.

Further, the thus prepared paints were mixed with an aluminium paint base which had preliminarily been prepared with an aminoacryl paint varnish, so that the mixing ratio of pigment to alumina was 1/5. In this case, the paint according to the invention showed clearer colour tone and more excellent gloss than the conventional paint.

EXAMPLE 63

Polyurethane Paint Varnish

A polyurethane paint varnish was admixed with C.I. pigment Yellow 95 alone (Comparative Example) and with a mixed pigment composition comprising C.I. pigment Yellow 95 and compound m in a proportion of 90:10, so that in each case the pigment component constituted 10%. The fluidity and the state of coloured film of the paints thus obtained were compared. It was found that the paint using the pigment composition of the present invention was superior in fluidity, colour tone and gloss of the coloured film.

EXAMPLE 64

Rosin-modified phenol resin offset printing ink

A rosin-modified phenol resin offset printing ink varnish was admixed with C.I. pigment Red 57 alone (Comparative Example) and with a mixed pigment composition comprising C.I. pigment Red 57 and compound c in a proportion of 85:15, so that in each case the pigment component constituted 30%. The fluidity of the offset inks thereby obtained was compared by means of a parallel plate type viscometer. It was found that the pigment composition of the present invention was much superior.

Further, it was found that when applied to printing matter, the pigment composition of the present invention presented better clearness in colour tone, better tinting strength, and better transparency.

We claim:

1. A pigment composition comprising a pigment and a colouring compound of the general formula (I),

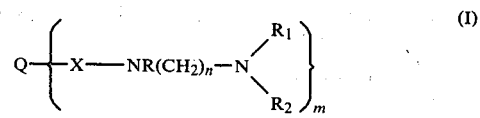

wherein Q represents a residue of a colouring compound other than phthalocyanine, X represents $-SO_2-$ or $-CO-$, m and n represent, respectively, an integer of from 1 to 4 and an integer of from 1 to 6, R represents a hydrogen atom, an alkyl group having from 1 to 20 carbon atoms or an alkenyl group having from 2 to 20 carbon atoms, and $R_1$ and $R_2$ represent, independently, a hydrogen atom, a substituted or unsubstituted alkyl group having from 1 to 20 carbon atoms or a substituted or unsubstituted alkenyl group having from 2 to 20 carbon atoms, or $R_1$ and $R_2$ together form a heterocyclic ring which contains a nitrogen, oxygen or sulfur atom therein.

2. A pigment composition according to claim 1, which comprises 100 parts by weight of the pigment and from 0.3 to 30 parts by weight of the colouring compound.

3. A pigment composition according to claim 1 or 2, wherein Q in general formula (I) is selected from the group consisting of quinacridone, dioxazine, anthrapyrimidine, anthanthrone, indanthrone, flavanthrone, perynone, perylene, thioindigo, 4,4'-diamino-1,1'-dianthraquinonyl and azo compounds.

4. A pigment composition according to claim 1 or 2, wherein Q in general formula (I) is selected from the group consisting of:

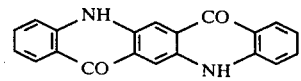

-continued

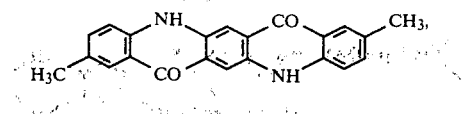

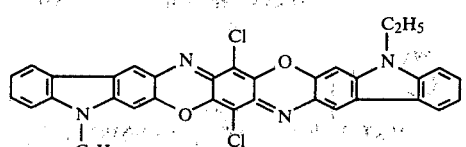

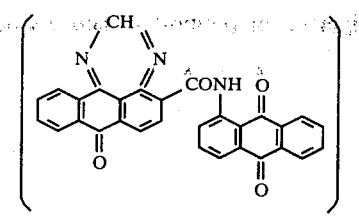

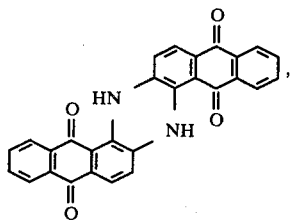

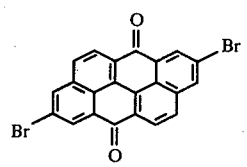

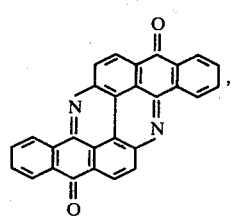

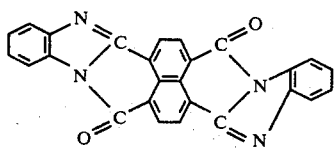

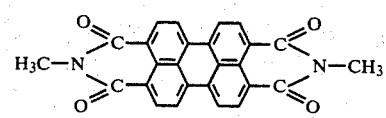

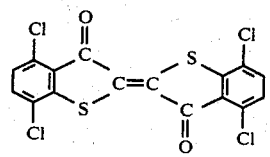

-continued

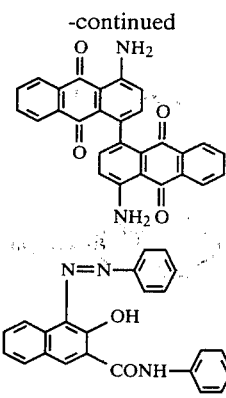

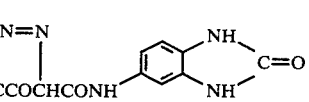

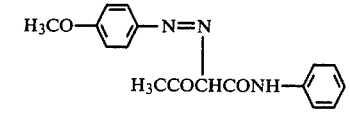

and

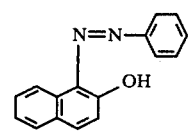

5. A pigment composition according to claim 1 or 2 wherein R represents a hydrogen atom.

6. A pigment composition according to claim 1 or 2, wherein $R_1$ and $R_2$ represent, independently, an alkyl group having from 1 to 4 carbon atoms or $R_1$ and $R_2$ together with the adjacent nitrogen atom form a heterocyclic ring selected from

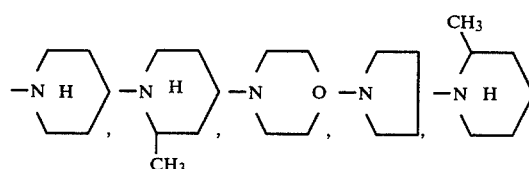

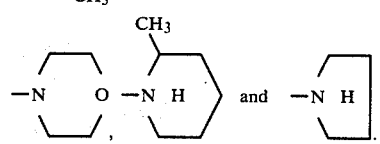

7. A pigment composition according to claim 1 or 2 wherein n is an integer of from 1 to 5.

8. A pigment composition according to claim 1 or 2, wherein the colouring compound of the general formula (I) is selected from the group consisting of

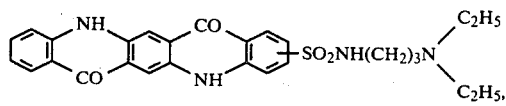

-continued
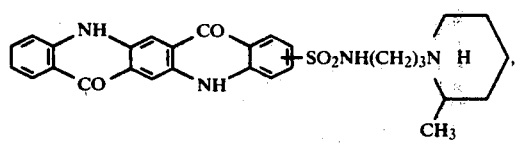
-continued
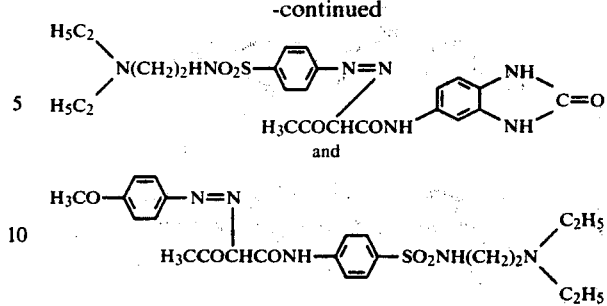
9. The pigment composition of claim 1 wherein X is —CO—.

UNITED STATES PATENT AND TRADEMARK OFFICE
CERTIFICATE OF CORRECTION

PATENT NO. : 4,310,359                    Page 1 of 3

DATED      : 12 January 1982

INVENTOR(S) : Shigeyuki Ehashi et al

It is certified that error appears in the above—identified patent and that said Letters Patent is hereby corrected as shown below:

Col. 12, line 41, after "manner" insert ---similar---.

Col. 13, line 17, "dibuthylpropylamine" should read ---dibutylpropylamine---.

Col. 17, line 7, "according in" should read ---according to---.

Col. 24, in Table 3, symbols consisting of circles and concentric circles have been deleted. Accordingly, Table 3 should read as follows:

| Example | Pigment | Compound identification | Mixing ratio | Immediately after preparation | 1 day after preparation | 1 week after preparation |
|---|---|---|---|---|---|---|
| Comparative Example 19 | C.I. Pigment Blue 15 | - | - | △ | x | x |
|  | " | i | 90 : 10 | ⊙ | ⊙ | ⊙ |
| Comparative Example 24 | C.I. Pigment Violet 19 | - | - | △ | x | x |
|  | " | c | 90 : 10 | ⊙ | ⊙ | ⊙ |

UNITED STATES PATENT AND TRADEMARK OFFICE
CERTIFICATE OF CORRECTION

PATENT NO. : 4,310,359

DATED : 12 January 1982

INVENTOR(S) : Shigeyuki Ehashi et al

It is certified that error appears in the above—identified patent and that said Letters Patent is hereby corrected as shown below:

Col. 24, Table 3 continued:

| Comparative Example | C.I. Pigment Red 168 | –  | –      | ○ | △ | × |
|---|---|---|---|---|---|---|
| 33 | " | e' | 95 : 5 | ⊚ | ⊚ | ⊚ |
| Comparative Example | C.I. Pigment Red 179 | – | – | △ | × | × |
| 39 | " | y | 90 : 10 | ⊚ | ⊚ | ⊚ |

Evaluation:  ⊚ Completely uniform

○ White streaks appear in a slight degree

△ White stripe patterns appear

× White substance is completely separated

Col. 24, line 23, "admixted" should read ---admixed---.

Claim 3, line 5, "thionindigo" should read ---thioindigo---.

UNITED STATES PATENT AND TRADEMARK OFFICE
CERTIFICATE OF CORRECTION

PATENT NO. : 4,310,359

DATED : 12 January 1982

INVENTOR(S) : Shigeyuki Ehashi et al

It is certified that error appears in the above—identified patent and that said Letters Patent is hereby corrected as shown below:

Claim 4, Col. 29, the formula spanning lines 15-20 should read as follows:

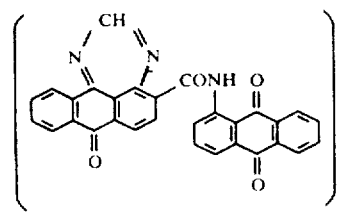

Signed and Sealed this

Seventeenth Day of May 1983

[SEAL]

Attest:

DONALD J. QUIGG

Attesting Officer

Acting Commissioner of Patents and Trademarks